(12) United States Patent
Luo et al.

(10) Patent No.: US 12,182,895 B2
(45) Date of Patent: Dec. 31, 2024

(54) NEURAL NETWORK BASED IDENTIFICATION DOCUMENT PROCESSING SYSTEM

(71) Applicant: Uber Technologies, Inc., San Francisco, CA (US)

(72) Inventors: Tao Luo, San Jose, CA (US); Chuang Wu, Fremont, CA (US); Jinxue Zhang, Union City, CA (US); Xiaoxiang Ren, San Mateo, CA (US); Chandan Sheth, Fremont, CA (US); Zihe Liu, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 94 days.

(21) Appl. No.: 17/948,068

(22) Filed: Sep. 19, 2022

(65) Prior Publication Data
US 2023/0008443 A1    Jan. 12, 2023

Related U.S. Application Data

(63) Continuation of application No. 16/832,711, filed on Mar. 27, 2020, now Pat. No. 11,449,960.
(Continued)

(51) Int. Cl.
| | | |
|---|---|---|
| *G06Q 50/26* | (2024.01) | |
| *G06F 18/21* | (2023.01) | |
| *G06F 18/22* | (2023.01) | |
| *G06N 3/04* | (2023.01) | |
| *G06N 3/08* | (2023.01) | |
| *G06T 3/02* | (2024.01) | |
| *G06V 10/82* | (2022.01) | |
| *G06V 30/19* | (2022.01) | |

(Continued)

(52) U.S. Cl.
CPC ....... *G06Q 50/265* (2013.01); *G06F 18/2178* (2023.01); *G06F 18/22* (2023.01); *G06N 3/04* (2013.01); *G06N 3/08* (2013.01); *G06T 3/02* (2024.01); *G06V 10/82* (2022.01); *G06V 30/19173* (2022.01); *G06V 30/413* (2022.01); *G06V 40/172* (2022.01); *H04L 67/306* (2013.01); *G06V 10/247* (2022.01)

(58) Field of Classification Search
None
See application file for complete search history.

(56) References Cited

U.S. PATENT DOCUMENTS

| | | |
|---|---|---|
| 7,725,421 B1 | 5/2010 | Gedalius et al. |
| 8,131,685 B1 | 3/2012 | Gedalius et al. |

(Continued)

*Primary Examiner* — Leon Flores
(74) *Attorney, Agent, or Firm* — Fenwick & West LLP

(57) ABSTRACT

A system processes images of documents, for example, identification documents. The system transforms an image of a document to generate an image that represent the document in a canonical form. For example, if the input image has a document that is tilted at an angle with respect to the sides of the image, the system modifies the orientation of the document to show the document having sides aligned with the sides of the image. The system stores user accounts that include user information including images. The system generates a graph of nodes that represent user accounts with edges determined based on similarity scores between user accounts. The system determines connected components of user accounts, such that each connected component represents user accounts that have a high likelihood of being duplicates.

20 Claims, 11 Drawing Sheets

Related U.S. Application Data

(60) Provisional application No. 62/825,016, filed on Mar. 27, 2019.

(51) Int. Cl.
*G06V 30/413* (2022.01)
*G06V 40/16* (2022.01)
*H04L 67/306* (2022.01)
*G06V 10/24* (2022.01)

(56) References Cited

U.S. PATENT DOCUMENTS

| | | |
|---|---|---|
| 2008/0243837 A1 | 10/2008 | Davis et al. |
| 2013/0139224 A1 | 5/2013 | Wehmeier et al. |
| 2017/0199905 A1 | 7/2017 | Ott et al. |
| 2019/0019020 A1 | 1/2019 | Flament et al. |

Fully-connected connected
component 900

Star shape connected
component 910

Chain shape connected
component 920

Connected component of
sub-components 930

Connectivity score: 0.23

Connected component 940A

Connectivity score: 0.5

Connected component 940B

Connectivity score: 0.5

Connected component 940C

Connected Component 1000A

Connected component 1000B

Connected component 1000C

NEURAL NETWORK BASED IDENTIFICATION DOCUMENT PROCESSING SYSTEM

CROSS REFERENCE TO RELATED APPLICATIONS

The application is a continuation of co-pending U.S. application Ser. No. 16/832,711, filed Mar. 27, 2020, which in turn claims the benefit of provisional patent application 62/825,016, filed on Mar. 27, 2019, each of which is herein incorporated by reference in its entirety.

FIELD OF ART

The present invention generally relates to the field of document/image processing using artificial intelligence, and more specifically, to neural network based detection of errors in documents comprising images and correction of errors by transformation of the documents.

BACKGROUND

User accounts for various applications are primarily based on information input from associated users. Conventionally, when a user makes an account for a system, the system may request the user to enter personal information, such as name, address, or phone number, according to an embodiment. In another embodiment, the user may be required to upload an image of their identification document, used by the system to verify their identity. The system can then use the identification document to ensure that no duplicate user accounts are created for one user.

However, there are several flaws in this method that prevent the system from properly identifying all users. In some instances, users may use upload images of identification documents pictured at slightly different orientations or with distortion. As a result, this may make images within an identification document appear slightly altered from their actual appearance or have other issues with quality. Further, these images may be altered to contain false identifying information (e.g., name, address date of birth, etc.) so a user can make multiple accounts with the same identification document. Given this, the system may be unable to identify duplicate images associated with various user accounts.

SUMMARY

Systems and methods are disclosed herein for comparing identification documents using image processing based on deep neural networks. These systems and methods may be applied to images of identification documents to fix document errors, such as distortion or orientation of the document. By transforming the images of identification documents to fix these errors, the system can more easily and effectively extract information, including identifying information about a user (e.g., name, address, image of the user, etc.).

In some embodiments, the system receives a request for processing an identification document. The request may include an image of the identification document, which itself comprises a second image and text. For example, a user may upload an identification document that may have an arbitrary orientation. The identification document may include a photo of the user as an example of the second image and text, for example, name of the user, date of birth, and so on. The system provides the image to one or more deep neural networks that are configured to determine output values indicative of an orientation of the identification document in the image and/or an orientation of the second image. The system identifies the boundaries of the identification document in the image and determines an orientation of the identification document in the image based on the output values. In an embodiment, the system determines the orientation of the document based on the position of the second image within the image of the identification document. For example, if the photo of the user (second image) is expected to be in the upper left corner of the identification document but the system determines based on the model output that the photo of the user is in the lower right corner of the identification document, the system determines that the identification document is upside down. The system transforms the image to modify the orientation and/or boundary of the identification document and transmits the transformed image to a client device for display.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Configuration Overview

This application details a preprocessing technique that fixes document errors, such as orientation and distortion, of an image depicting a document image of an identification document. Examples of identification documents include driver's licenses, passports, or any other government-issued identification document. The system employs the preprocessing technique to transform the document image to modify the orientation and/or boundary of the identification document and, in some embodiments, crops out the document image from the image. Further, the system may employ this preprocessing technique to transform images of identification documents for use in identifying duplicate user accounts on the system. In these embodiments, the system determines the similarities between document images, such as by using facial recognition on the document images to identify faces that are similar to one another across a plurality of document images. The system may then employ a clustering algorithm to reduce the rate of false positives in similarity matches, improving its precision in identifying similar document images.

Computing Environment

Figure 1:
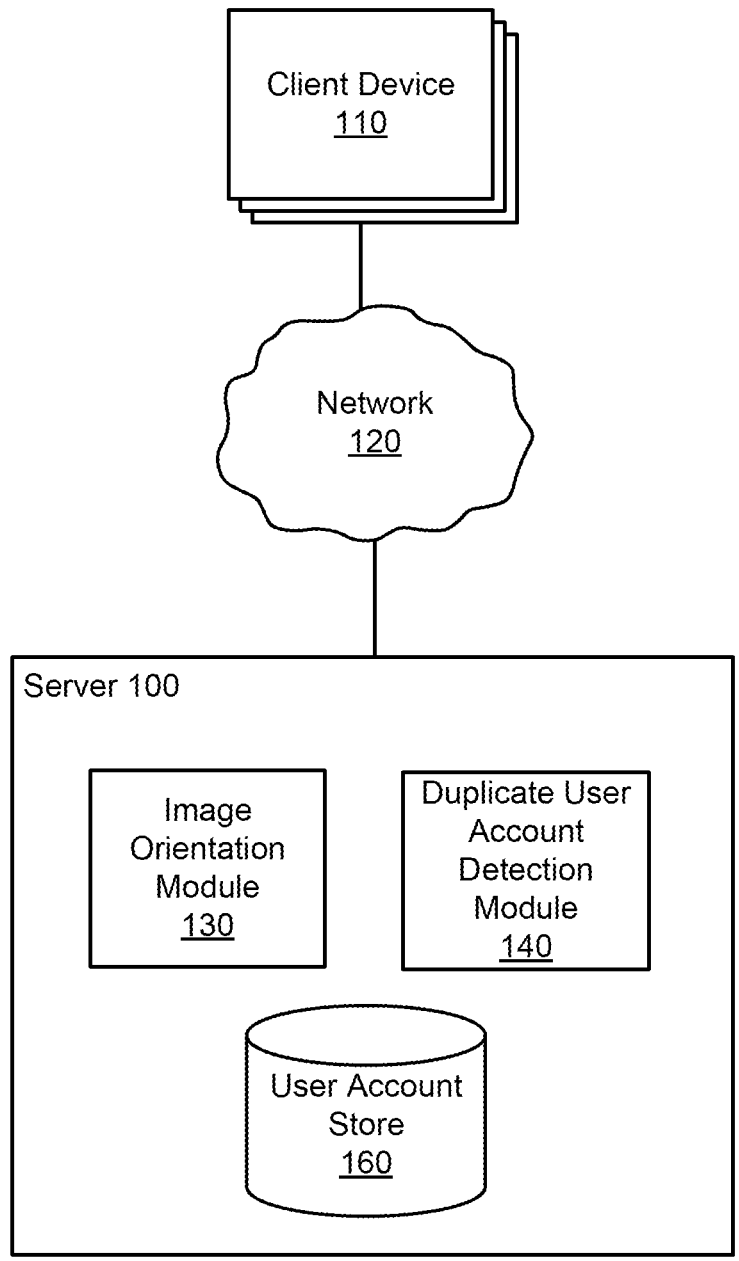
FIG. 1 illustrates a computing environment for processing documents, according to one embodiment.

FIG. 1 illustrates a computing environment for processing documents, according to one embodiment. The computing environment, or system, includes a client device 110, network 120, and server 100, according to an embodiment. These various components are now described in additional detail.

The client device 110 is a computing device such as a smart phone, laptop computer, desktop computer, or any other device that can access the network 120 and, subsequently, the server 100. In the embodiment of FIG. 1, there is one client device. In other embodiments, there may be a plurality of client devices.

The network 120 may be any suitable communications network for data transmission. In an embodiment such as that illustrated in FIG. 1, the network 120 uses standard communications technologies and/or protocols and can include the Internet. In another embodiment, the entities use custom and/or dedicated data communications technologies.

The network 120 connects the client device 110 to the server 100. The server 100 comprises an image orientation module 130, a user account store 160, and a duplicate user account detection module 140. In other embodiments, there may be other modules included in the server. The server 100 processes identification documents (i.e., "documents," for simplicity). The image orientation module 130 detects orientation of a document in a given image, for example, the position at which the document is placed and the orientation and distortion of the document in a given image. The duplicate user account detection module 140 detects whether two user accounts are duplicates, i.e., user accounts of the same user. The user account store 160 stores user accounts within the system. A user account is associated with a user of the system and contains identifying information such as name, address, phone number, and images of identification documents, according to an embodiment. In other embodiments, user accounts may include more or less information about users associated with the accounts.

FIG. 1 shows one possible configuration of the system. In other embodiments, there may be more or fewer systems or components, for example, there may be multiple servers 100 or the server 100 may be composed of multiple systems such as individual servers or load balancers.

Figure 2:
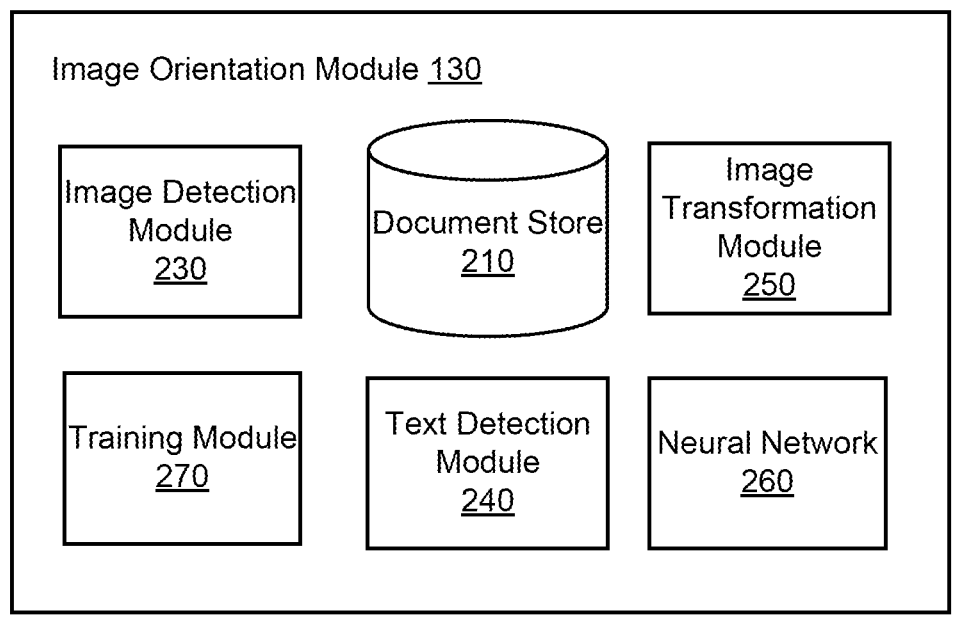
FIG. 2 is a high-level block diagram illustrating a detailed view of the image orientation module, according to one embodiment.

FIG. 2 is a high-level block diagram illustrating a detailed view of the image orientation module, according to one embodiment. The image orientation module 130 receives an image of a document and determines the orientation and distortion of the document in the given image, for example, orientation of an identification document in an image submitted to the server 100 for evaluation. The orientation of the document may include the angle of rotation, the direction of rotation, and the position of the document in the image. The various components of the image orientation module 130 include, but not limited to, a document store 210, an image transformation module 250, an image detection module, a text detection module 240, a neural network 260, and a training module 270, according to one embodiment. In other embodiments, there may be other components not shown in FIG. 2.

The document store 210 stores images of documents, for example, electronic copies of physical identification documents associated with a user. Examples of identification documents include passport, driver license, national or state ID, and so on. Identification documents may be used to verify the identity of a user. Some examples of identification documents include drivers' licenses and passports. A user uploads an image to the system of the user's identification document. Typically, an identification document includes an image and text. The text may include information describing the user, for example, the user's name, the user's address, the user's date of birth, date the document was issued, date of expiry of the document, and an identification number. The image in the document is typically an image of the user, for example, a photo of the user.

The image transformation module 250 processes the image of an identification document associated with a user. The image transformation module 250 detects the identification document within the image and transforms the image to reorient and/or scale the identification document within the image, according to an embodiment. In various embodiments, an identification document may be distorted or rotated relative to the orientation of the image itself. These orientations are further described in FIG. 6.

The image detection module 230 receives for processing, an input image comprising a document and detects one or more images within the bounds of the document. In an embodiment, an image detected within the document is of a user identified by the identification document, for example, an image of the face of the user. The image detected within the document may be stored in relation to the user and user account in the user account store 160. In other embodiments, image detection module 230 detects other images within the document and stores them in the user account store 160. Examples of possible images that are detected include images of the user's signature, the background of the identification document, and the shape of a geographical region associated with the identification document, like a state or province.

The image detection module 230 also records the location of an image in a document, the size of the image, orientation of the image, relative positions of two images, relative position of an image and a text, and other parameters describing the image or images within the document. In some embodiments, the image detection module 230 uses these features of the image to determine the location of the document in the image, so that the document may be transformed. For example, certain types of identification documents have the user's image at a particular location within the document, having a particular size with respect to the size of the document and a particular orientation with respect to the identification document or with respect to one or more text fields or text snippets present in the document. In an embodiment, the image detection module 230 uses these features to detect the type of identification document and the correct orientation of the identification document. Accordingly, the duplicate user account detection module 140 extracts the features describing the images and provides them as input to a machine learning model.

The machine learning model is trained using training data set comprising images of various identification documents. The machine learning model is configured to determine scores indicative of the parameters describing the document within an input image, for example, scores indicative of the position of the document within the image, orientation of the document, and so on. In some embodiments, the neural network 260 may automatically infer these parameters and use them for detecting type of the identification document, orientation of the identification document, and other type of information describing the document. In some embodiments, the machine learning model determines a boundary of the input image and uses the boundaries to determine the parameters.

The text detection module 240 detects text within the transformed images of identification documents. Text may include, according to some embodiments, a user's name, address, identification number, or other identification information. In other embodiments, the text detection module 240 detects text boundaries instead of or in conjunction with text. The detected text may be stored in the user account store 160 in relation to the associated user and user account. In some embodiments, the text from the transformed images is compared to information contained within the user account to verify the validity of the information. The text detection module 240 also records the location of text in a document, which may be used to determine the location and the orientation of the document within the image.

In an embodiment, the text detection module 230 performs optical character recognition (OCR) to recognize certain snippets of the text, for example, "Name", "Date of Birth", "Address", and so on. The image detection module 230 generates features based on positions of these text snippets within the document, for example, relative to a particular corner of the document. The image detection module 230 generates features based on relative positions of various text snippets, for example, the position of the "Address" snippet with respect to the "Name" snippet and so on. The image detection module 230 generates features based on relative positions of images within the document compared to various text snippets, for example, the position of the image of the user with respect to the "Name" snippet, or the position of a logo in the identification document with respect to the "Address" snippet, and so on. The image orientation module 130 provides these features as input to a machine learning model, for example, the neural network 260.

The neural network 260 is configured to receive an encoding of an image as input and predict one or more values describing the document within the input image, for example, scores indicative of the position of the document within the input image, the orientation, or the document within the input image, and so on. In an embodiment, the neural network 260 is a deep neural network with one or more hidden layers. The hidden layers determine features of the input image that are relevant to predicting the above scores. In this embodiment, the neural network receives an encoding of an input image that is transformed by layers of artificial neurons, where the inputs for neurons at a given layer come from the previous layer, and all of the outputs for a neuron are provided as input to the subsequent layer. In an embodiment, the neural network 260 comprises an input component that provides input to a plurality of output components, each output component configured to predict a particular parameter value describing the document in an input image. In an embodiment, the neural network 260 is a convolutional neural network. In some embodiments, the neural network is included in the image transformation module 250.

The training module 270 trains the neural network using, for example, supervised learning techniques based on labelled training data comprising various images and their respective parameters values. The training of the neural network 260 is based on a back propagation process that adjusts the weights of the neural network to minimize an aggregate measure of error between predicted parameter values and actual parameter values provided in the training data. The training process may be repeated for each image provided in a training dataset. Although several embodiments described herein are based on neural networks, the techniques disclosed are applicable to various types of machine learning based models that may or may not be based on deep learning, for example, decision tree based models, random forest based models, logistic regression based models, and so on.

Figure 3:
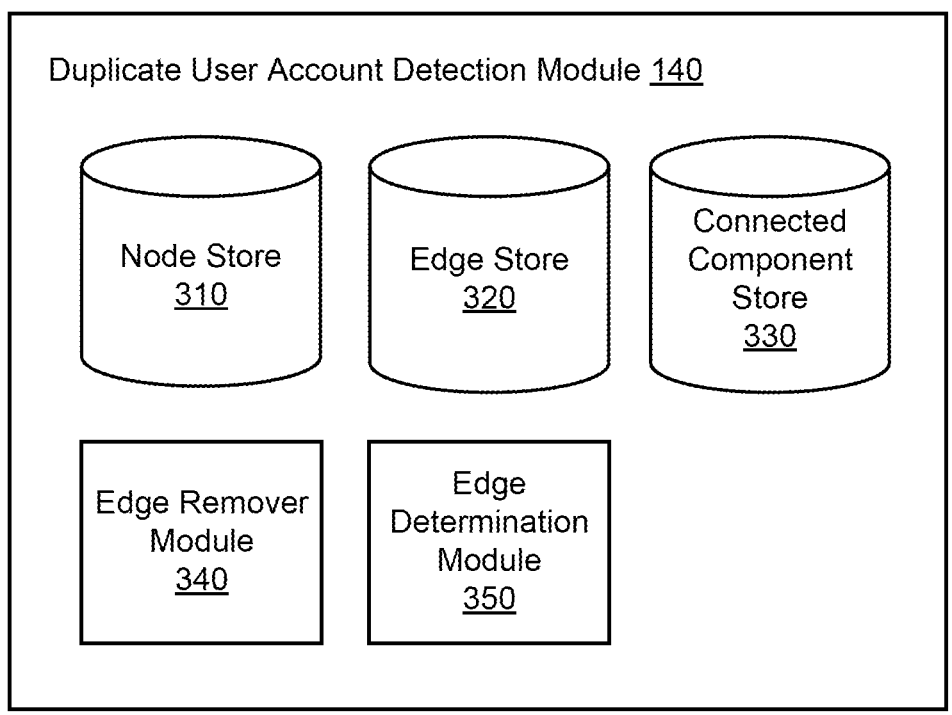
FIG. 3 is a high-level block diagram illustrating a detailed view of the duplicate user account detection module, according to one embodiment.

FIG. 3 is a high-level block diagram illustrating a detailed view of the duplicate user account detection module, according to one embodiment. The duplicate user account detection module 140 identifies similar user accounts within the system. The various components of the duplicate user account detection module 140 include, but are not limited to, a node store 310, an edge store 320, a connected component store 330, an edge remover module 340, and an edge determination module 350, according to one embodiment. In other embodiments, there may be other components not shown in FIG. 3. The duplicate user account detection module 140 maintains a graph comprising nodes representing user accounts and edges representing associations between pairs of nodes that represent similar user accounts. The duplicate user account detection module 140 transforms the graph by iteratively modifying the graph as described herein.

The node store 310 stores nodes associated with user accounts within the system. The user accounts are associated with information and images that may be used to identify a user. The edge store 320 stores edges between nodes. The edges are associated with similarity scores between nodes, wherein a similarity score indicates the degree of similarity between a set of nodes. An edge exists between a pair of nodes if the similarity score between the pair of nodes exceeds a threshold value.

The edge determination module 350 determines the edges between sets of nodes. The edge determination module 350 compares the user accounts associated with a set of nodes to determine a similarity score indicating a degree of similarity between the user accounts. In some embodiments, the edge determination module 350 compares the information of the user accounts to determine duplicate information. The information of the user accounts may be entered by a user or may be gathered from the text detected from the user's associated identification document. Further, in some embodiments, the edge determination module 350 compares the images from identification documents associated with user accounts for similarity by comparing the location of pixels within the images. For example, the edge determination module may use facial recognition between images on identification documents to determine if the identification documents (and therefore user accounts) represent the same user. The edge determination module may convert images of user's faces on identification documents into an embeddings (i.e., multi-dimensional vectors describing characteristics of the faces) and use distance between vectors to determine a degree of similarity between user's faces of different user accounts. In some embodiments, a neural network may be used to determine similarity between user accounts. For example, the neural network may be trained on labelled sets of known duplicate user accounts to determine a degree (or percentage) of similarity, represented as a similarity score, between user accounts based on embeddings describing the users' faces. The similarity score is stored in association with the edge.

The connected component store 330 stores the nodes and edges that form a connected component. Connected components indicate a high degree of similarity between the nodes in the connected components. The nodes of the connected components are interconnected to multiple other nodes within the connected component, according to some embodiments. In some embodiments, the node store 310, edge store 320, and connected component store 330 are combined such that nodes, edges, and connected components are stored together. Although the techniques disclosed herein determine connected components of the graph to identify duplicate user accounts, the system may use other techniques for dividing a graph into subgraphs representing duplicate user accounts. For example, some embodiments may use clustering algorithm to divide a graph into clusters of nodes based on certain criteria, for example, a measure of connectivity between nodes of the cluster. Each cluster determines by such a process comprises duplicate user accounts.

The edge remover module 340 removes edges between nodes. In an embodiment, the edge remover module simply associates an edge with a flag indicating that the edge is removed. In other embodiments, the edge remover module 340 deletes a representation of the edge from a data structure representing the graph. The edge remover module 340 determines a threshold similarity score. The edge remover module 340 compares the similarity scores associated with edges to the threshold score and removes edges with a similarity score that indicates a lower degree of similarity than the threshold score. The threshold score may be updated to indicate higher similarity between nodes as the process is performed to remove more edges to find nodes with higher similarity. As the threshold score value is updated to indicate higher similarity, the number of edges of the graph decreases since edges indicative of similarity less that the degree of similarity corresponding to the threshold score are removed. As a result, the number of connected components of the graph increases and the average size of connected components decreases.

Image Transformation

Figure 4:
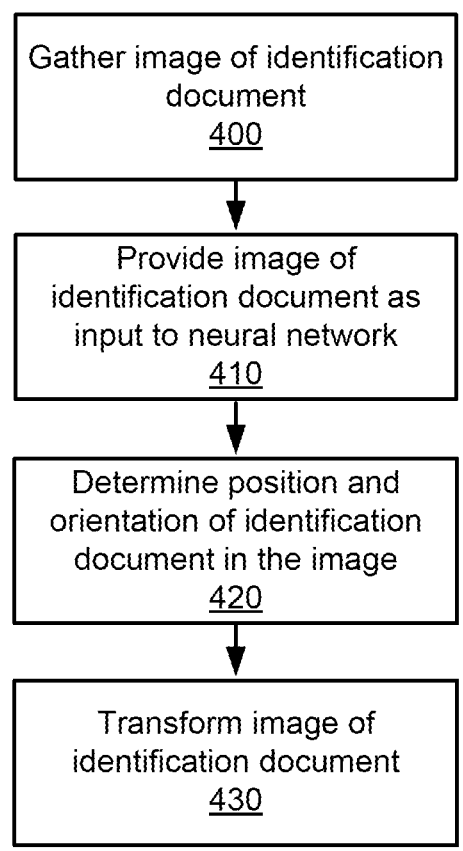
FIG. 4 is a flowchart illustrating the process for image transformation from an identification document, according to one embodiment.

FIG. 4 is a flowchart illustrating the process for image transformation from an identification document, according to one embodiment. The system gathers 400 an image of an identification document. The image is input by a user of the system to show proof of and verification of their identity through an identification document. In some embodiments, the user may enter the image to the system directly from a camera on the client device 110. The image is stored in relation to a user account store of the user in the user account store 160. Once the image has been entered into the system by the user, the system provides 410 the image of the identification document as input to the neural network 260, which determines using the image detection module 230 and the text detection module 240 parameters describing the document, for example, the location of the document within the image and the orientation of the identification document in the image.

The system uses the neural network 260 to determine 420 the position and the orientation of the identification document in the image. In an embodiment, the neural network 260 is further configured to determine 420 the bounding box and aspect ratio of the image. For example, a certain point of the image may be considered as the origin and the position of the document may be determined as the coordinates of a point of the document such as a corner. The system may represent the orientation of the image using an angle. For example, certain orientation of the document may be considered as a default orientation and any other orientation may be represented using an angle by which the document needs to be rotated to reach that orientation. The system may further represent dimensions of the document using a scaling factor. For example, a particular size of the document may be considered as the default size. If the image is captured such that the document is much smaller than the default size, the system stores a scaling factor indicating the actual size of the document compared to the default size. Once the parameters of the identification document, including the position, orientation, and dimensions, have been confirmed, the system transforms 430 the images to change the parameters of the identification document to standardized values. In an embodiment, the system further extracts areas of interest from the image, for example, the system may extract a portion of the image that shows the document if the image includes objects or patterns in the background other than the document.

Although FIG. 4 illustrates a number of interactions according to one embodiment, the precise interactions and/or order of interactions may vary in different embodiments. For example, the neural network may be configured to receive an input image of a document and output parameters for transforming the image of the identification document to generate an image displaying the identification document in a canonical form. In some embodiments, the image is received from a user. Further, upon transforming the image, the system may send the transformed image to the client device 110 of the user associated with the image or an administrator, for display.

The system transforms the images to change the location and orientation and fix the distortion of the identification document to a canonical form. For example, a particular point of the image is considered an origin, for example, the lower left corner. A particular orientation of the identification document is considered a canonical orientation, for example, the orientation in which the image of the person identified is displayed in a position in which the head of a person standing upright would face the viewer of the image. Furthermore, in a canonical orientation, the identification document has edges parallel to the edges of the image. In the canonical orientation, the position of the identification document is such that the lower left corner of the identification document is within a threshold of the lower left corner of the image when displayed on a display screen. For example, the lower left corner of the identification document may overlap with the lower left corner of the image. In the canonical form, the identification document has a size that is within a threshold percentage of the size of the image, for example, the dimensions of the identification document are at least 80% of the dimensions of the image. Furthermore, the shape of the identification document in a canonical form is rectangular. The image transformation module 250 performs geometric transformation of the identification document such that the transformed identification document is in a canonical form, also known as fixing the distortion of the identification document. Accordingly, the image transformation module 250 may enlarge the identification document if the identification document in the image is below a threshold size; the image transformation module 250 may move the position of the identification document within the image to bring the identification to a canonical position; the image transformation module 250 may rotate the identification document in the image to change the orientation of the identification document to a canonical orientation; and if the identification document is not in a rectangular shape, the image transformation module 250 may stretch the identification document such that one side of the document is increased in size more than another size to transform the identification document to a rectangular shape.

Figure 5:
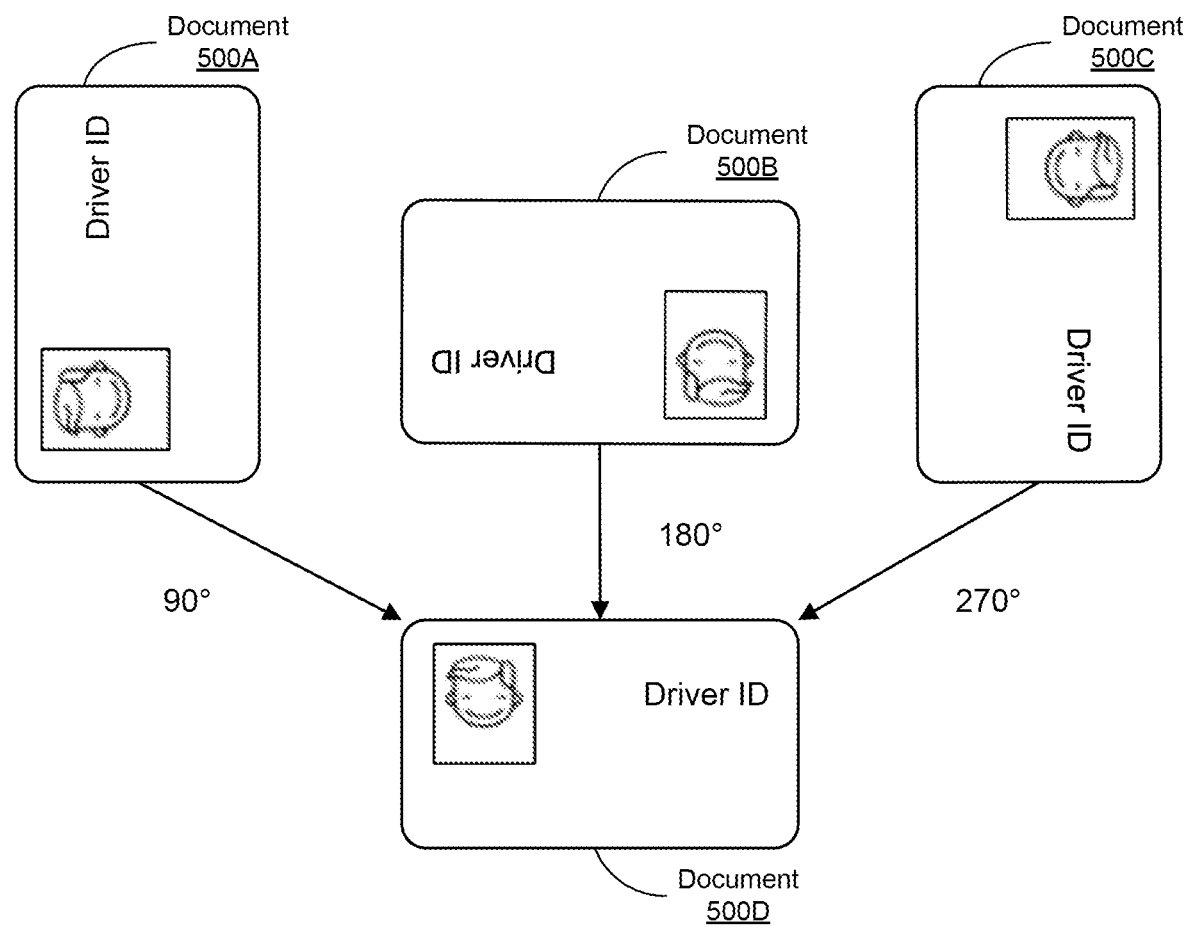
FIG. 5 illustrates photo orientation corrections, according to one embodiment.

FIG. 5 illustrates photo orientation corrections, according to one embodiment. In this example, the identification document, or document 500, is a driver's license, or "Driver ID." The document 500 may have different orientations, such as document 500A, document 500B, and document 500C. Document 500A shows an embodiment where the document is orientated 90 degrees to the left from the canonical (or standardized) orientation shown in the embodiment of document 500D. Document 500B shows an embodiment where the document is orientated 180 degrees from document 500D. Document 500A shows an embodiment where the document is orientated ninety degrees to the right of document 500D. In other embodiments, the angle of the orientation that differs from the canonical orientation of document 500D may be any angle between 0 and 360 degrees.

After the orientation of the document 500 is detected using the image detection module 230 and the text detection module 240, the image transformation module 250 performs a photo orientation correction, as shown in the figure, to transform the orientation of document 500A, document 500B, and document 500C to the orientation of document 500D.

Figure 6A:
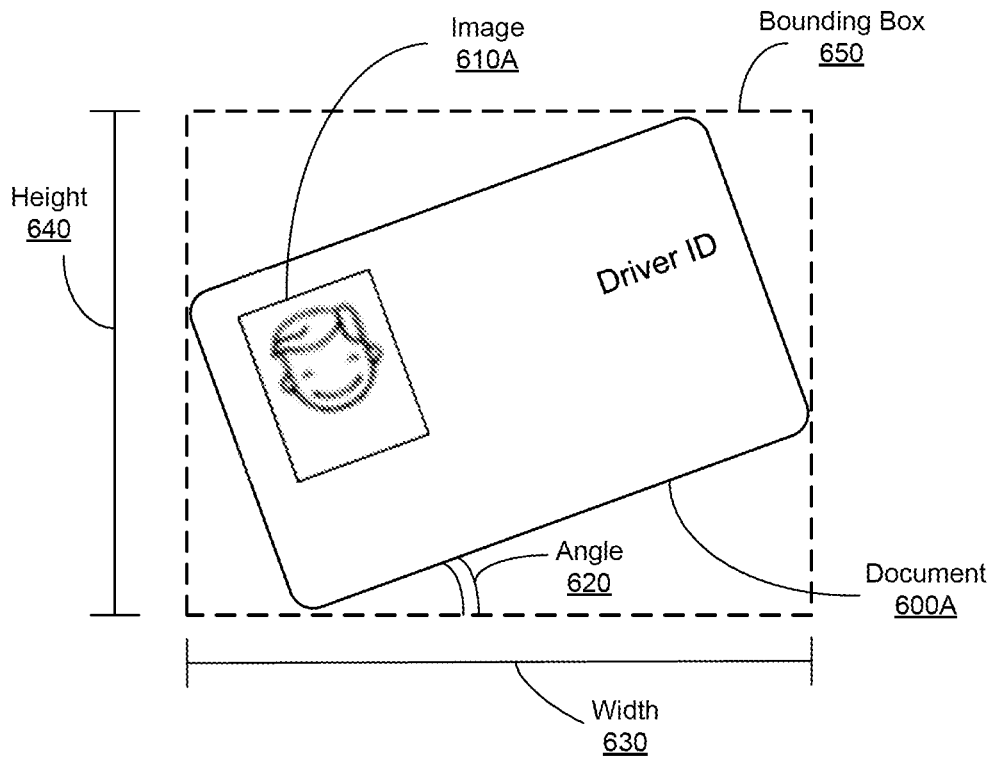
FIG. 6A illustrates a generic photo orientation correction, according to one embodiment.

FIG. 6A illustrates a generic photo orientation correction, according to one embodiment. In this example, the identification document, or document 600A, is a driver's license, or "Driver ID." The document 600A includes an image 610A that depicts a user associated with the document 600A. The document 600A is rotated an at angle 620, θ, of a value between 0 and 360 degrees from a standardized orientation, such as the orientation of document 500D shown in FIG. 5. The height 640, or h', of the bounding box 650 of the document 600A may be determined using the geometric equation w'=w*cos(θ)+h*sin(θ), where w is the width of the document 600A and h is the height of the document 600A. The width 630, or w', of the bounding box 650 of the document 600A may also be determined using the geometric equation h'=h*cos(θ)+w*sin(θ). The image 610A is also rotated by the same angle 620 from the standardized orientation as the rest of the document 600A. This information may be used by the image detection module to determine the orientation of the document 600A once it has determined the location of document 600A in an image.

Figure 6B:
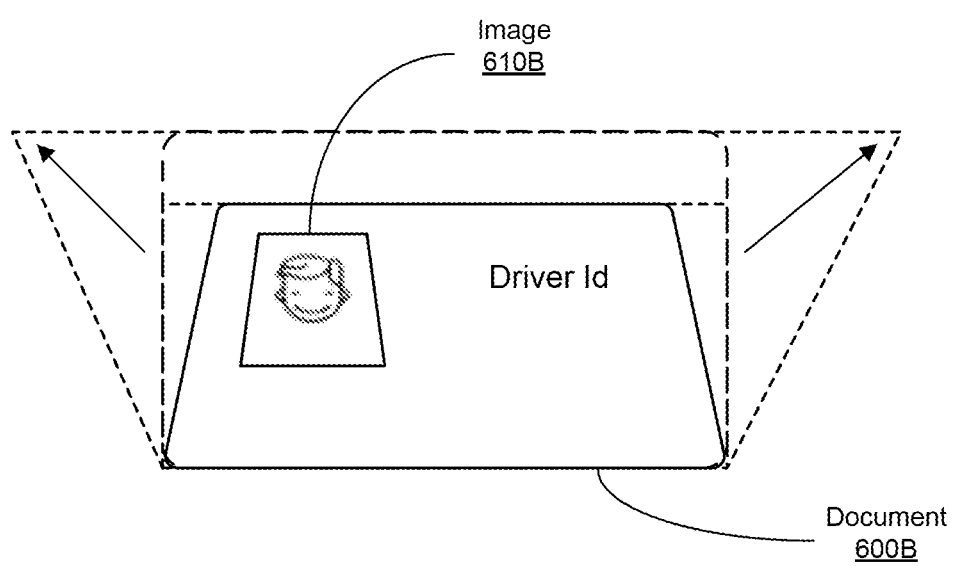
FIG. 6B illustrates transforming the identification document to change the shape of the identification document, according to one embodiment.

FIG. 6B illustrates transforming the identification document to change the shape of the identification document, according to one embodiment. The system detects that the identification document needs a correction based on the shape of the identification document in the image since the identification document is trapezoidal in shape with two unequal parallel sides rather than rectangular with equal parallel sides. The system performs the correction by transforming the identification document to stretch the dimensions of the document, thereby generating a rectangular identification document image. In another embodiment, the system detects the boundary of the document 600B and performs the correction based on the dimensions of the boundary. In this example, the identification document, or document 600, is a driver's license, or "Driver ID." The document 600B includes an image 610B that depicts a user associated with the document 600B. In the embodiment depicted in FIG. 6B, the document is rotated into the image, such that rotating the document out, where out is depicted in the direction of the arrows, would transform the document 600B to the canonical shape (i.e., rectangular shape). The image 610B is also rotated inward by the same amount from the standardized orientation as the rest of the document 600B. This information is used by the image detection module to determine the orientation of the document 600B once it has determined the location of document 600B in an image.

Figure 7:
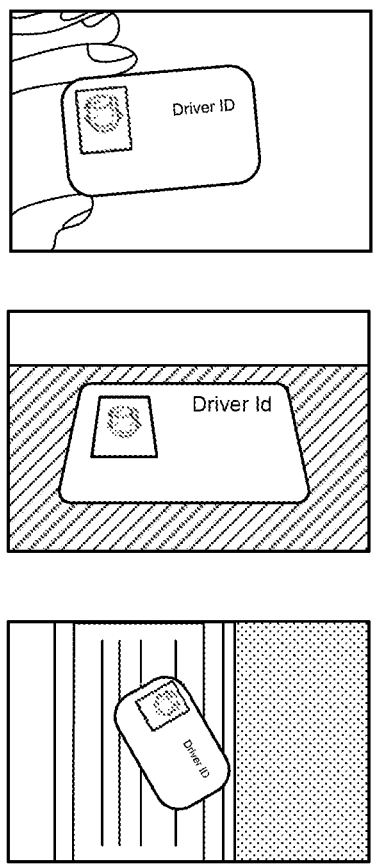
FIG. 7 illustrates example images of identification documents, according to one embodiment.

FIG. 7 illustrates example images of documents, according to one embodiment. The example images are oriented at different example orientations, none of which are exactly the standardized orientation. Though some orientations may appear close to the standardized orientation of document 500D depicted in FIG. 5, the user placement of the identification documents in each image is slightly different, and therefore the images may have to be transformed for the identification documents to be in the standardized orientation. In addition, the background of each image is different, and the system only needs the document itself, not the background, which may be distracting based on patterns and objects included in the background. Therefore, in some embodiments, the image transformation module 250 removes the background of the image to leave only the identification document in the standardized orientation.

Detection of Duplicate User Accounts

Once an identification document is transformed to a canonical form, the identification document is stored in association with the user account. Images of identification documents that have been transformed to canonical form can be compared with higher accuracy. In one embodiment, the system uses image processing techniques for comparing images of faces of people to determine whether the images represent the face of the same person. In another embodiment, the system uses machine learning based techniques, for example, deep learning based techniques for comparing images of faces of people to determine whether two images show the face of the same user. The system uses image comparison as well as comparison of user account information to determine whether two user accounts belong to the same user. This allows the system to identify duplicate user accounts and take appropriate user actions, for example, sending a message to the user to consolidate the user accounts or to disable at least some of the user accounts. Users may create multiple user accounts to bypass certain checks performed by the system based on policies. For example, if a user account is flagged as violating certain policy enforced by the system, the user may create an alternate account. Similarly, if the system enforces certain quota per user, a user may create multiple user accounts to game the system, thereby exceeding the quota. Embodiments of the invention detect duplicate user accounts to ensure that each user has a single user account, thereby enforcing the policies strictly.

Figure 8:
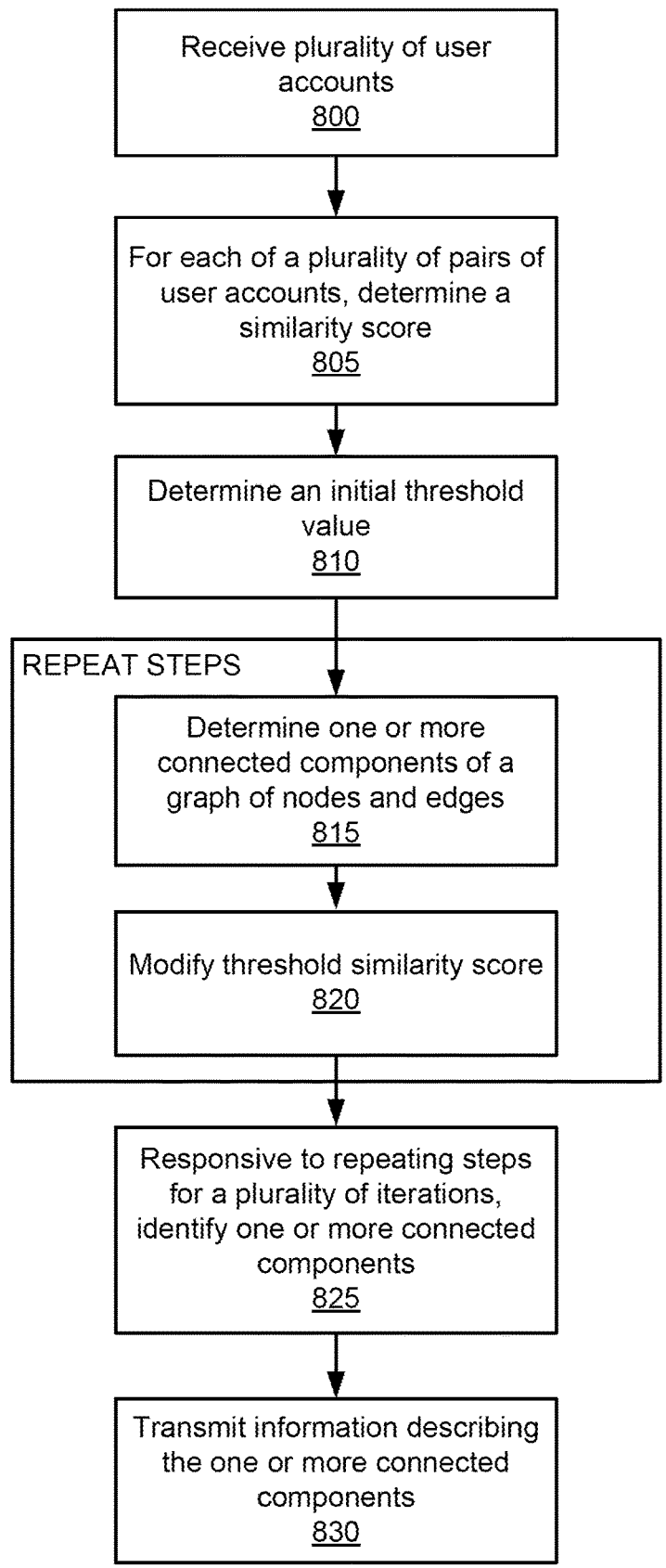
FIG. 8 is a flowchart illustrating the process for identifying duplicate user accounts, according to one embodiment.

FIG. 8 is a flowchart illustrating the process for identifying duplicate user accounts, according to one embodiment. The system receives 800 a plurality of user accounts and, for each of a plurality of pairs of user accounts, determines 805 a similarity score indicative of similarity between a first user account and a second user account in the pair. The system determines 810 an initial threshold similarity score that is indicative of a particular degree of similarity between user accounts. This initial threshold similarity score is used to determine which user accounts are similar to one another and which user accounts are not similar to one another. The system repeats the following steps 815 and 820 for a plurality of iterations to determine connected components of user accounts, where connected nodes in a graph represent similar user accounts. Each iteration of the steps has a threshold similarity score, which is initialized to the initial threshold similarity score.

The system determines 815 one or more connected components in the graph of nodes and edges. The nodes represent user accounts, and a pair of nodes has an edge is the similarity score of the pair of nodes indicates a greater degree of similarity than that indicated by the threshold similarity score. In some embodiments, a greater number for a similarity score may indicate a greater degree of similarity. In other embodiments, a smaller number for a similarity score may indicate a greater degree of similarity. The system modifies 820 the threshold similarity score for the next iteration to a value indicative of a higher degree of similarity between user accounts compared with the threshold similarity score for the current iteration. In some embodiments, the system removes edges with a similarity score with a degree of similarity less than the modified threshold similarity score. Accordingly, the initial connected components include user accounts that may not be very similar but as the iterations proceed the user accounts in each connected component are more likely to be similar and represent duplicate user accounts. The system repeats the steps 815 and 820 until the user accounts are within a certain degree of similarity. This may be determined by the size of connected components or the number of connected components or the value of the similarity score. For example, in some embodiments, the system repeats the steps 815 and 820 until the system can no longer remove edges from the connected components due to a high degree of similarity.

Responsive to repeating the steps for a plurality of iterations, the system identifies 825 one or more connected components, where each connected component represents sets of user accounts for a particular user. The system stops the iterations based on certain criteria. For example, in an embodiment, the system repeats the process for a fixed number of iterations. In another embodiment, the system stops the iterations if there are no changes in the connected components between subsequent iterations or if the changes in the connected components are below a threshold amount between iterations. In some embodiments, the system stops the iterations if the number of connected components exceeds a threshold. In some embodiments, the system determines whether an aggregate measure based on sizes of connected components reaches below a threshold, thereby indicating that the connected components are dense (i.e., most, if not all, nodes in the connected component are connected to one another). The system transmits 830 information describing the identified one or more connected components to a privileged user, for example, an analyst for verification. At the end of the process, the system has connected components of user accounts that represent duplicate accounts with a high likelihood.

In some embodiments, the system uses a connection ratio threshold to determine whether to alter the threshold similarity score. The connection ratio threshold represents how dense a connected component is (i.e. the number of edges per number of nodes that must exist within a connected component for the system to indicate that the connected component likely contains duplicate user accounts). The connection ratio threshold may be specified by a user, for example, as a system configuration parameter specified by a system administrator. Alternatively, the system may analyze previous results to estimate a connection ratio threshold. For example, the system identifies various connected components determined during previous executions of the process illustrated in FIG. 8. The system marks the nodes that were determined to represent duplicate user accounts at the end of execution of the process. For each connected component, the system identifies the number of edges in the connected component and determines whether the connected component contains duplicate user accounts. The system determines an aggregate measure of number of edges of connected components that contain duplicate user accounts. In an embodiment, the connection ratio threshold is a value determined to be aggregate measure of ratios of number of edges of connected components containing duplicate user accounts and the size of the connected component as indicated by the number of nodes of the connected component.

The system saves connected components with more edges as determined using the connection ratio threshold. These connected components may also be referred to as dense connected components, which contain nodes of likely duplicate user accounts. The system determines if a connected component is sparse, i.e., it has a small number of edges compared to the size of the connected component by comparing the ratio of the number of edges of the connected component and the number of nodes of the connected component with the connection ratio threshold. If the system determines that the ratio of the number of edges of the connected component and the number of nodes of the connected component is smaller than the connection ratio threshold, the system modifies the threshold similarity score representing the degree of similarity of connected components to break the connected components into smaller, denser connected components. For example, a connected component with 5 nodes would have 10 edges if the connected component is fully-connected. A connection ratio of 7 may indicate that the connected component must be connected by at least 70% of the maximum number of edges. Accordingly, the system saves dense connected components with 7 or more edges and alters the threshold similarity score to remove some edges to divide a sparse connected component into smaller, denser connected components.

In some embodiments, the system calculates a connectivity ratio for each connected component and compares the connectivity ratio to the connection ratio threshold. The connectivity ratio may be a relationship between the number of edges, k, and nodes, n, in a connected component, as show in Equation 1.

$$\frac{n(n-1)}{2} \qquad \text{Equation 1}$$

In embodiments where the connected component is fully-connected, the connectivity ratio may be represented by Equation 2.

$$\frac{k}{\frac{n(n-1)}{2}} \quad \text{Equation 2}$$

If the system determines that the connectivity ratio is smaller than the connection ratio threshold, the system modifies the threshold similarity score representing the degree of similarity of connected components to break the connected components into smaller, denser connected components.

The system stores the connected component information by associating user accounts belonging to the same connected component. In some embodiments, the system sends messages to users determined to have duplicate user accounts requesting the users to consolidate the user accounts or delete additional user accounts. In some embodiments, the system disables one or more user accounts from a connected component. For example, the system identifies the oldest user account and keeps it active and disables all the remaining user accounts in the connected component. In an embodiment, the system identifies the user account that is associated with the most level of activity and disables the remaining user accounts. The system may disable a user account by preventing the user from using the account unless the user provides additional authentication information or calls and talks to a customer service representative to provide authentication information. If a user provides information indicating that a user account in the connected component is not a duplicate of another user account in the connected component, the information is stored in the user account store 160 and used the next time the duplicate detection process is executed. In an embodiment, the user account store 160 maintains a table storing relations between user accounts that have been verified as belonging to distinct users. Each user account may have a user account identifier that uniquely identifies the user account and the table stores pairs of user account identifiers for user accounts that are verified as belonging to distinct users. Accordingly, an edge between two user accounts is removed (or never created when the graph is initialized) if the two user accounts have been previously verified as being distinct user accounts.

It is appreciated that although FIG. 8 illustrates a number of interactions according to one embodiment, the precise interactions and/or order of interactions may vary in different embodiments. For example, the steps may only be repeated once for a particular threshold similarity score, according to some embodiments. In other embodiments, the steps may be repeated until a threshold level of connected components of user accounts have been formed or some other threshold condition has been met.

Figure 9A:
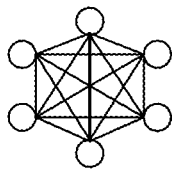
FIG. 9A illustrates examples of connected components of user accounts, according to one embodiment.
Figure 9A:
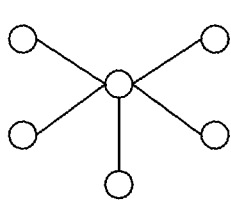
Figure 9A:
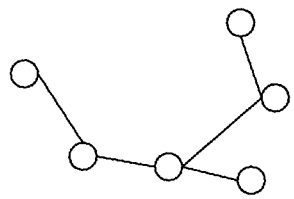
Figure 9A:
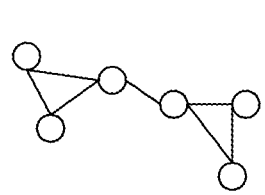

FIG. 9A illustrates examples of connected components of user accounts, according to one embodiment. A fully-connected connected component 900 has nodes that are connected to all other nodes in the connected component by edges. This type of connected component indicates that all of the user accounts associated with the nodes are within some degree of similarity to one another (i.e., directly connected to one another). Connected components 910, 920, 930 are examples of the low-quality connected components that need to be regenerated since not every node is connected by a degree of similarity. A star shape connected component 910 has a plurality of nodes all connected to one center node. This type of connected component indicates that the plurality of nodes are all within a degree of similarity to the center node but not within a the degree of similarity to one another. A chain shape connected component 920 has a plurality of nodes connected in chains. This type of connected component indicates that nodes are connected to one another within a degree of similarity but are not all similar to one another within that degree. In some embodiments, each node in a chain shape connected component 920 is each only connected to two other nodes. In other embodiments, some nodes in the connected component may be connected to more than two nodes, but some nodes in the connected component must only be connected to two nodes maximum. A connected component of sub-components 930 connected nodes in separate connected components into one connected component. This indicates that the connected components are similar in some way. The connected components are connected by inside nodes, which are the nodes that connect the connected components to one another. In some embodiments, there may be more than one pair of inside nodes connecting a connected component.

Figure 9B:
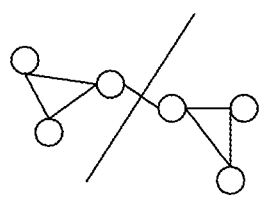
FIG. 9B illustrates an example of forming connected components after modifying the threshold value for the threshold similarity scores.
Figure 9B:
Figure 9B:
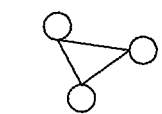
Figure 9B:
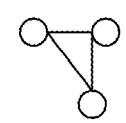

FIG. 9B illustrates an example of forming connected components after modifying the threshold value for the threshold similarity scores. In this example, a larger number indicates a greater degree of similarity. FIG. 9B example depicts a connected component of sub-components 940A, wherein the edges in the connected component have a similarity score greater than 0.23. When the threshold value is updated to a value above 0.23, edges are removed from the connected component of sub-components 940A. This results in the removal of an inside edge that was connecting two connected components, connected component 940B and connected component 940C, together. Connected component 940B and connected component 940A have nodes with a higher degree of similarity than the nodes in the connected component of sub-components 940A.

Figure 10A:
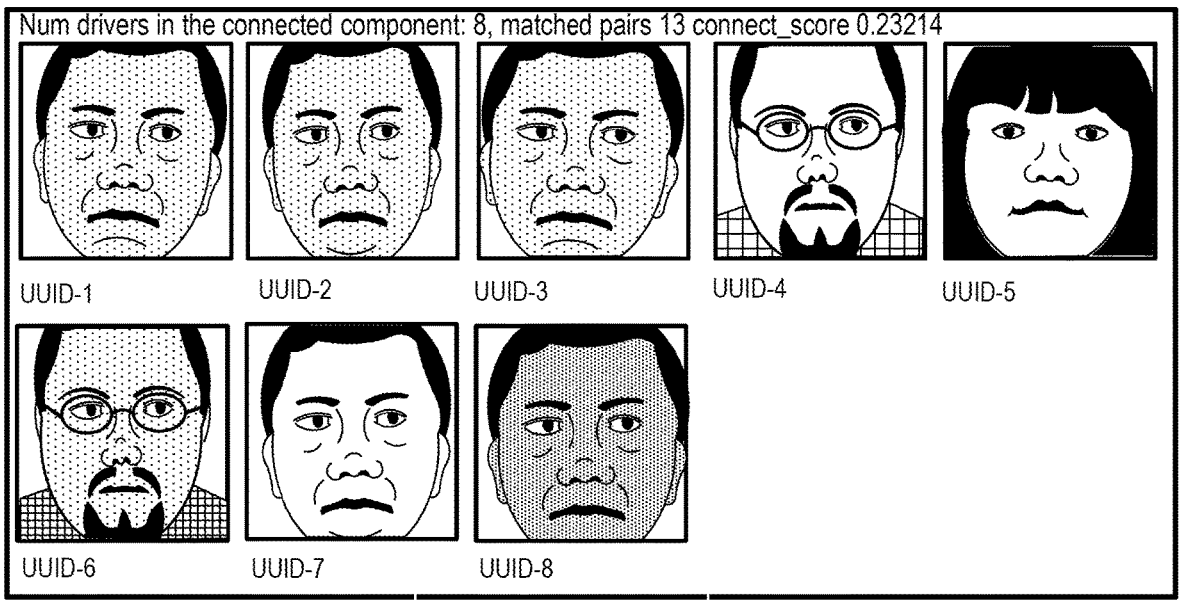
FIG. 10A illustrates an example of a set images from identification documents at one threshold value, according to one embodiment.

FIG. 10A illustrates an example of a set images from documents at one threshold value, according to one embodiment. In this example, a larger number indicates a greater degree of similarity. Each image in connected component 1000A represents a node and depicts a user associated with a different user account. The degree of similarity between the images is 0.23214.

Figure 10B:
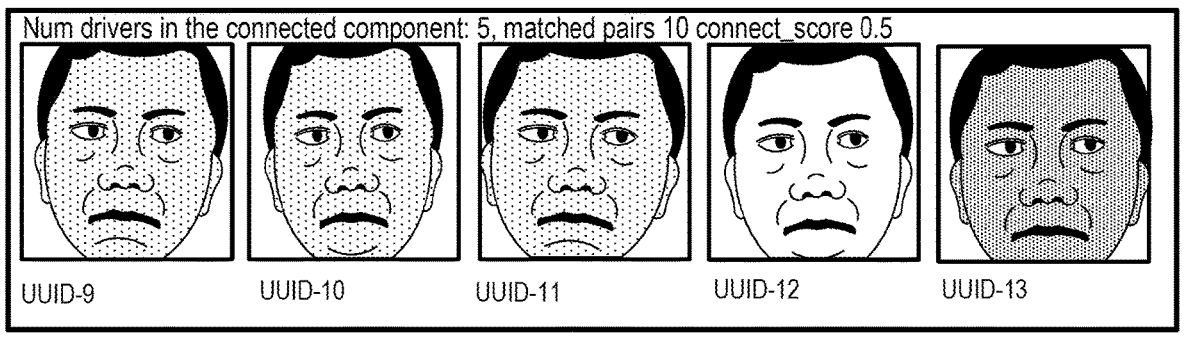
FIG. 10B illustrates an example of subsets of the set of images from FIG. 10A, the subsets of the set of images having a greater degree of similarity than the set of images from FIG. 10A, according to one embodiment.
Figure 10B:
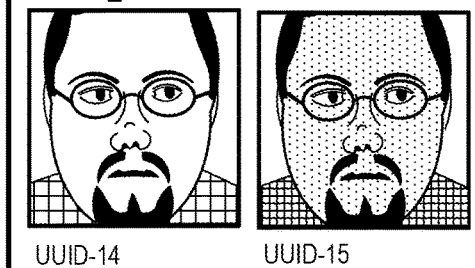

FIG. 10B illustrates an example of subset of the set of images from FIG. 10A, the subsets of the set of images having a greater degree of similarity than the set of images from FIG. 10A, according to one embodiment. The degree of similarity between the images in connected component 1000B is 0.5, and the degree of similarity between the images in connected component 1000C is 0.5. The images in connected component 1000B appear to depict the same user, indicating that the user has signed up for five accounts to circumvent the rules of the system or allowed other users to use their identification document, according to come embodiments. The same is true for connected component 1000C, but only two user accounts have been made with that user's image from their identification document.

Computer Architecture

Figure 11:
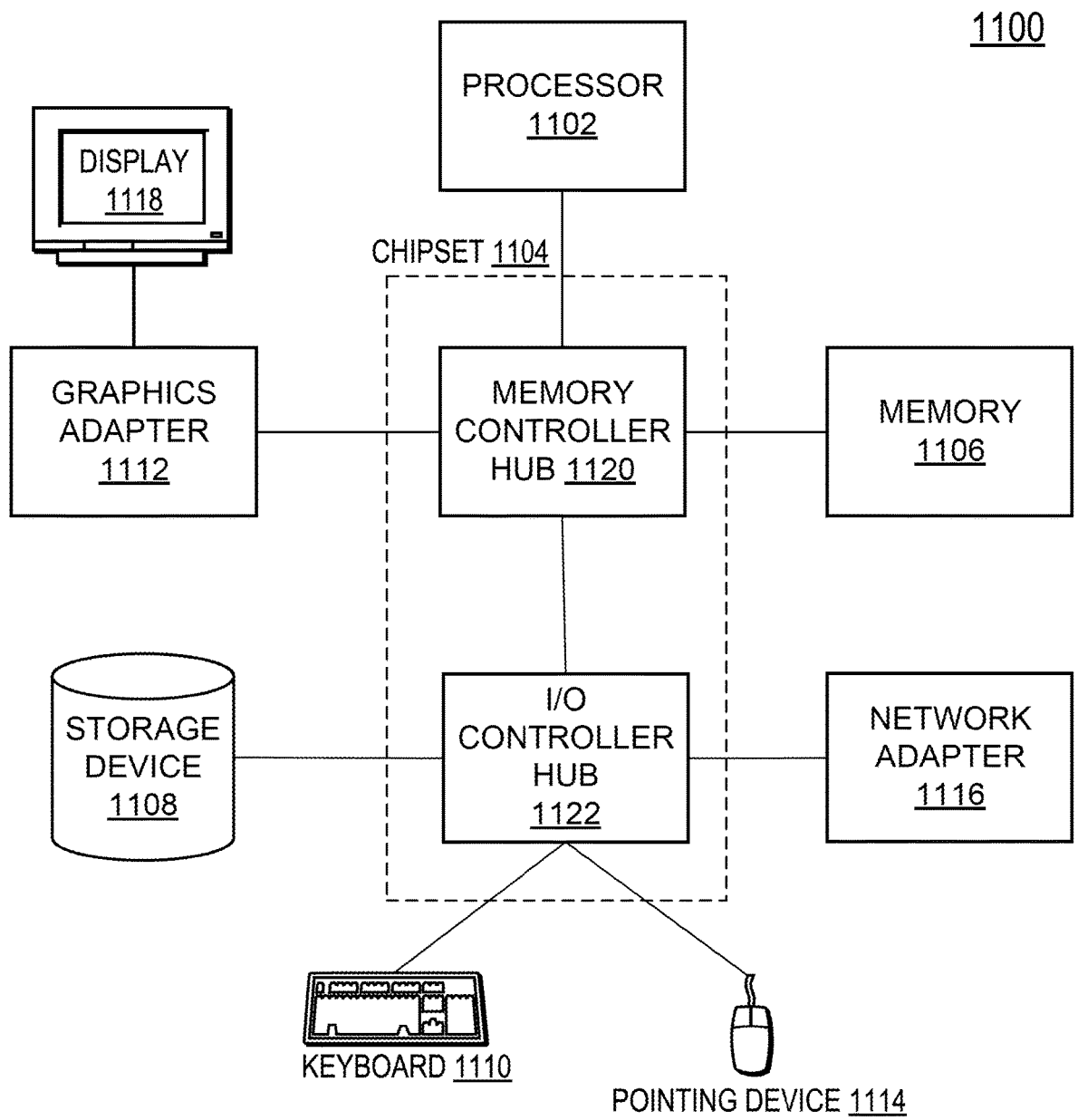
FIG. 11 is a high-level block diagram illustrating physical components of a computer used as part or all of the client device from FIG. 1, according to one embodiment.

FIG. 11 is a high-level block diagram illustrating physical components of a computer used as part or all of the client device from FIG. 1, according to one embodiment. Illustrated are at least one processor 1102 coupled to a chipset 1104. Also coupled to the chipset 1104 are a memory 1106, a storage device 1108, a graphics adapter 1112, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is any non-transitory computer-readable storage medium, such as a hard drive, compact disk read-only memory (CD-ROM), DVD, or a solid-state memory device. The memory 1106 holds instructions and data used by the processor 1102. The graphics adapter 1112 displays images and other information on the display 1118. The network adapter 1116 couples the computer 1100 to a local or wide area network.

As is known in the art, a computer 1100 can have different and/or other components than those shown in FIG. 4. In addition, the computer 1100 can lack certain illustrated components. In one embodiment, a computer 1100 acting as a server may lack a graphics adapter 1112, and/or display 1118, as well as a keyboard or pointing device. Moreover, the storage device 1108 can be local and/or remote from the computer 1100 (such as embodied within a storage area network (SAN)).

As is known in the art, the computer 1100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1108, loaded into the memory 1106, and executed by the processor 1102.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for identifying duplicate user accounts comprising:
    receiving a plurality of user accounts, each user account associated with both text data and image data;
    for each of a plurality of pairs of user accounts, the pair of user accounts comprising a first user account and a second user account, determining a similarity score indicative of similarity between the first user account and the second user account, wherein the similarity score is determined based on processing text data and image data associated with the first user account and the second user account;

determining an initial threshold similarity score, wherein the initial threshold similarity score is indicative of a particular degree of similarity between user accounts;

determining a graph comprising nodes and edges, wherein each node represents a user account, and a pair of nodes has an edge if the similarity score of the pair of nodes indicates a greater degree of similarity than that indicated by the initial threshold similarity score;

repeating for a plurality of iterations, wherein each iteration has a threshold similarity score different from a threshold similarity score in a previous iteration, each of the plurality of iterations comprising following steps:

modifying the threshold similarity score for a current iteration to a value indicative of a higher degree of similarity between user accounts compared to the threshold similarity score for a previous iteration; and modifying edges of the graph by pruning edges from a previous iteration of the graph that connect pairs of nodes with similarity scores below the modified threshold similarity score;

responsive to repeating the steps for the plurality of iterations, identifying one or more subgraphs within the graph, each including connected nodes, each identified subgraph representing a set of user accounts associated with a particular user; and transmitting information describing the set of user accounts associated with the particular user.

2. The computer-implemented method of claim 1, wherein each iteration further comprises:

responsive to modifying the threshold similarity score, removing one or more edges with a similarity score indicative of a degree of similarity less than the modified threshold similarity score.

3. The computer-implemented method of claim 1, wherein each user account is associated with an image, and wherein determining similarity scores between a pair of user accounts comprises performing facial recognition on the images and comparing results of facial recognition for the pair of user accounts.

4. The computer-implemented method of claim 1, wherein each user account is associated with text, and wherein determining similarity scores between a pair of user accounts comprises comparing text associated with each of the user accounts of the pair.

5. The computer-implemented method of claim 1, wherein the iterations are repeated until a current iteration determines a set of one or more connected components that are identical to the one or more connected components determined by a previous iteration.

6. The computer-implemented method of claim 1, further comprising:

disabling one or more accounts associated with nodes of at least one of the one or more identified subgraphs.

7. The computer-implemented method of claim 1, further comprising:

sending a message to at least one of the user accounts associated with nodes of at least one of the one or more identified subgraphs.

8. A non-transitory computer-readable storage medium comprising instructions executable by a processor, the instructions comprising:

instructions for receiving a plurality of user accounts, each user account associated with both text data and image data;

for each of a plurality of pairs of user accounts, the pair of user accounts comprising a first user account and a second user account, instructions for determining a similarity score indicative of similarity between the first user account and the second user account, wherein the similarity score is determined based on processing text data and image data associated with the first user account and the second user account;

instructions for determining an initial threshold similarity score, wherein the initial threshold similarity score is indicative of a particular degree of similarity between user accounts;

instructions for determining a graph comprising nodes and edges, wherein each node represents a user account, and a pair of nodes has an edge if the similarity score of the pair of nodes indicates a greater degree of similarity than that indicated by the initial threshold similarity score;

instructions for repeating for a plurality of iterations, wherein each iteration has a threshold similarity score different from a threshold similarity score in a previous iteration, each of the plurality of iterations comprising following steps:

instructions for modifying the threshold similarity score for a current iteration to a value indicative of a higher degree of similarity between user accounts compared to the threshold similarity score for a previous iteration; and instructions for modifying edges of the graph by pruning edges from a previous iteration of the graph that connect pairs of nodes with similarity scores below the modified threshold similarity score;

responsive to repeating the steps for the plurality of iterations, instructions for identifying one or more subgraphs within the graph, each including connected nodes, each identified subgraph representing a set of user accounts associated with a particular user; and instructions for transmitting information describing the set of user accounts associated with the particular user.

9. The non-transitory computer-readable storage medium of claim 8, wherein the instructions for each iteration further comprise:

responsive to modifying the threshold similarity score, instructions for removing one or more edges with a similarity score indicative of a degree of similarity less than the modified threshold similarity score.

10. The non-transitory computer-readable storage medium of claim 8, wherein each user account is associated with an image, and wherein determining similarity scores between a pair of user accounts comprises performing facial recognition on the images and comparing results of facial recognition for the pair of user accounts.

11. The non-transitory computer-readable storage medium of claim 8, wherein each user account is associated with text, and wherein the instructions for determining similarity scores between a pair of user accounts comprise instructions for comparing text associated with each of the user accounts of the pair.

12. The non-transitory computer-readable storage medium of claim 8, wherein the iterations are repeated until a current iteration determines a set of one or more connected components that are identical to the one or more connected components determined by a previous iteration.

13. The non-transitory computer-readable storage medium of claim 8, the instructions further comprising:
instructions for disabling one or more accounts associated with nodes of at least one of the one or more identified subgraphs.

14. The non-transitory computer-readable storage medium of claim 8, the instructions further comprising:
instructions for sending a message to at least one of the user accounts associated with nodes of at least one of the one or more identified subgraphs.

15. A computer system comprising:
a computer processor; and
a non-transitory computer-readable storage medium storing instructions that when executed by the computer processor perform actions comprising:
receiving a plurality of user accounts, each user account associated with both text data and image data;
for each of a plurality of pairs of user accounts, the pair of user accounts comprising a first user account and a second user account, determining a similarity score indicative of similarity between the first user account and the second user account, wherein the similarity score is determined based on processing text data and image data associated with the first user account and the second user account;
determining an initial threshold similarity score, wherein the initial threshold similarity score is indicative of a particular degree of similarity between user accounts;
determining a graph comprising nodes and edges, wherein each node represents a user account, and a pair of nodes has an edge if the similarity score of the pair of nodes indicates a greater degree of similarity than that indicated by the initial threshold similarity score;
repeating for a plurality of iterations, wherein each iteration has a threshold similarity score different from a threshold similarity score in a previous iteration each of the plurality of iterations comprising following steps:
modifying the threshold similarity score for a current iteration to a value indicative of a higher degree of similarity between user accounts compared to the threshold similarity score for a previous iteration; and
modifying edges of the graph by pruning edges from a previous iteration of the graph that connect pairs of nodes with similarity scores below the modified threshold similarity score;
responsive to repeating the steps for the plurality of iterations, identifying one or more subgraphs within the graph, each including connected nodes, each identified subgraph representing a set of user accounts associated with a particular user; and
transmitting information describing the set of user accounts associated with the particular user.

16. The computer system of claim 15, wherein the actions for each iteration further comprise:
responsive to modifying the threshold similarity score, removing one or more edges with a similarity score indicative of a degree of similarity less than the modified current threshold similarity score.

17. The computer system of claim 15, wherein each user account is associated with an image, and wherein determining similarity scores between a pair of user accounts comprises performing facial recognition on the images and comparing results of facial recognition for the pair of user accounts.

18. The computer system of claim 15, wherein each user account is associated with text, and wherein determining similarity scores between a pair of user accounts comprises comparing text associated with each of the user accounts of the pair.

19. The computer system of claim 15, wherein the iterations are repeated until a current iteration determines a set of one or more connected components that are identical to the one or more connected components determined by a previous iteration.

20. The computer system of claim 15, the actions further comprising:
disabling one or more accounts associated with nodes of at least one of the one or more identified subgraphs.

* * * * *

UNITED STATES PATENT AND TRADEMARK OFFICE
CERTIFICATE OF CORRECTION

PATENT NO. : 12,182,895 B2
APPLICATION NO. : 17/948068
DATED : December 31, 2024
INVENTOR(S) : Luo et al.

Page 1 of 1

It is certified that error appears in the above-identified patent and that said Letters Patent is hereby corrected as shown below:

In the Claims

In Column 19, in Claim 15, Lines 38-39, delete "iteration" and insert -- iteration, --, therefor.

Signed and Sealed this
Third Day of June, 2025

Coke Morgan Stewart
*Acting Director of the United States Patent and Trademark Office*